United States Patent [19]

Dragner et al.

[11] Patent Number: 5,032,683

[45] Date of Patent: Jul. 16, 1991

[54] GLYOXAL MODIFIED AQUEOUS STARCH DISPERSION AND METHOD

[75] Inventors: Louis R. Dragner, Rock Hill; William C. Floyd, Chester; James W. Ramp, Rock Hill, all of S.C.

[73] Assignee: Sequa Chemicals, Inc., Chester, S.C.

[21] Appl. No.: 371,512

[22] Filed: Jun. 26, 1989

[51] Int. Cl.$^5$ ............... C08B 35/00; C08B 37/16; C08G 63/48; C08G 63/91

[52] U.S. Cl. .................. 536/104; 536/102; 536/103; 536/105; 536/106; 536/107; 536/110; 536/126; 525/54.2; 525/54.24

[58] Field of Search ............ 524/47, 48, 49, 50, 524/51; 127/69, 70, 71; 536/102, 103, 104, 105, 106, 107, 110, 126; 525/54.2, 54.24

[56] References Cited

U.S. PATENT DOCUMENTS

| | | | |
|---|---|---|---|
| 2,549,177 | 4/1951 | Davidson et al. | 428/533 |
| 2,867,615 | 1/1959 | Lehmann et al. | 536/104 |
| 3,320,080 | 5/1967 | Mazzarella et al. | 106/210 |
| 3,324,057 | 6/1967 | Suzumura et al. | 524/49 |
| 3,740,391 | 6/1973 | Williams et al. | 536/45 |
| 4,013,629 | 3/1977 | Cummisford et al. | 530/356 |
| 4,060,507 | 11/1977 | Floyd et al. | 528/245 |
| 4,155,884 | 5/1979 | Hughes | 536/104 |
| 4,343,655 | 8/1982 | Dodd et al. | 106/214 |
| 4,425,452 | 1/1984 | Nakata et al. | 524/47 |
| 4,455,416 | 6/1984 | Floyd et al. | 528/245 |
| 4,537,634 | 8/1985 | Floyd | 106/214 |
| 4,544,609 | 10/1985 | Hui | 428/507 |
| 4,547,580 | 10/1985 | Floyd | 549/379 |
| 4,656,296 | 4/1987 | Floyd | 549/379 |
| 4,695,606 | 9/1987 | Floyd et al. | 525/160 |

FOREIGN PATENT DOCUMENTS 1403807 10/1965 France.
2017124 10/1979 United Kingdom.

OTHER PUBLICATIONS

"Binder Insolubility: Formulators Explore Latest Methods, Systems"; May 1987, Pulp & Paper.

*Primary Examiner*—Nathan M. Nutter
*Attorney, Agent, or Firm*—Mitchell D. Bittman

[57] ABSTRACT

Modified starch dispersions are prepared by gelatinizing various starches and starch blends and reacting the starch in the presence of a glyoxal compound to produce an aqueous starch dispersion having a storage-stable and coatable viscosity. The starch dispersions provides a film which displays good tensile strength and elongation properties.

21 Claims, No Drawings

GLYOXAL MODIFIED AQUEOUS STARCH DISPERSION AND METHOD

BACKGROUND OF THE INVENTION

The present invention relates to aqueous starch dispersions and more particularly to starch dispersions containing glyoxal compounds and having coatable viscosity, good storage stability and which provides a film having good tensile strength and elongation properties.

Industrial starch may be utilized in a wide variety of applications including as coatings for paper or paper board. It desirably has good tensile and elongation properties, both under wet and dry conditions. Starch compositions may desirably be prepared in the form of coatable aqueous dispersions capable of being drawn down and cured on suitable substrates. The end user of these compositions may utilize them in a wide variety of applications by simply removing solvent to produce strong water resistant films.

For many commercial applications starch is gelatinized by the end user prior to being used. Gelatinization occurs after starch granules are dispersed as a slurry in water with the resultant aqueous slurry being heated to over 50° C. and usually over about 65° C. Under such conditions starch grains tend to absorb water, swell, and eventually rupture to allow starch fragments and molecules to disperse in water. This rupturing and dispersion is generally referred to as "gelatinization" and is an irreversible reaction resulting in a relatively thick starch dispersion. The ability to gelatinize starch on site just prior to its end use is undesirable for many end users because the additional equipment needed to handle and cook the starch is impractical or uneconomical.

A pre-gelatinized starch in liquid form would be desirable for certain end users as it would eliminate the need to handle dry starch and eliminate a cooking and dispersing step in the process. A problem with such pre-gelatinized starch is its stability over time. Because the product may spend many days in distribution and transportation, and because it sometimes is stored for a time prior to use at its ultimate destination, it is important that the product have a somewhat extended storage life wherein it maintains its desirable qualities and characteristics, particularly coatable viscosity. Prior art gelatinized starch products containing amylose tend to undergo a process known as retrogradation which results in the formation of a gel or precipitate. The viscosity also tends to thicken over time to a point which renders the products unusable for many commercial purposes. The problem is that by the time the pre-gelatinized starch product has been transported to its end user and prepared for use, it has often thickened to a point where it is no longer of a coatable viscosity. A preferred viscosity is about 350 centipoise or less. Viscosities above about 1000 centipoise are not readily flowable and are generally not usable in products such as coatings.

The cross-linking of starches with multifunctional reagents which are reactive with starch hydroxyl groups is well known. Glyoxals and polyaldehyde compounds and resins have been previously utilized as cross-linkers. The simple mixing of glyoxal with a starch dispersion will provide a gel. U.S. Pat. No. 4,455,416 describes a paper coating containing starch binder and a cyclic urea/glyoxal/polyol condensate as an insolubilizer for the binder. As an insolubilizer the glyoxal condensate is inactive until the coating is applied and cured upon drying whereupon the glyoxal crosslinks the starch to impart water resistance. U.S. Pat. No. 4,021,260 describes ethoxylated fatty alcohols as starch viscosity control agents. U.S. Pat. No. 3,324,057 discloses the use of dialdehyde starch in the preparation of paper coatings. U.S. Pat. No. 3,740,391 describes the production of aqueous dispersions of a starch first reacted with an acrylamide and, subsequently, with glyoxal. U.S. Pat. No. 4,013,629 discloses a glyoxal binder system. U.S. Pat. No. 4,425,452 discloses coating paper material via an enzymatically converted starch. British Patent No. 2017124 discloses polysaccharides cross-linked with glyoxal.

BRIEF DESCRIPTION OF THE INVENTION

It is an object of the present invention to provide aqueous starch dispersions having low to moderate viscosity even at high solids content.

It is a further object of the invention to provide pre-gelatinized starch dispersions having extended storage lives such that they maintain coatable viscosity over time.

It is a further object of the invention to provide starch dispersions having improved film-forming properties.

It is another object of the invention to provide films having good wet and dry tensile strength and elongation properties.

It is another object of the invention to provide films which are resistant to water.

It is another object of the invention to provide novel cost effective methods for preparing the improved starch dispersion of the invention.

These and other objects are achieved by providing an aqueous modified starch dispersion comprising a starch which has been gelatinized and reacted with a glyoxal compound at temperatures of at least 70° C. The glyoxal compound is effective in decreasing the viscosity of said dispersion 24 hours after gelatinization by at least about 20 centipoise relative to an analogous starch composition gelatinized in the absence of any glyoxal compound. As used herein, an analogous starch composition gelatinized in the absence of any glyoxal compound is a starch composition whose components, other than glyoxal compounds bear the same weight ratio to each other as exists for those components in the glyoxal-containing composition that is being compared.

The present invention further provides methods of preparing an aqueous modified starch dispersion comprising gelatinizing an aqueous dispersion of starch and reacting the starch with a glyoxal compound at a temperature and for a time sufficient to react the starch and glyoxal. Preferably the starch is gelatinized during said reaction with the glyoxal compound.

DETAILED DESCRIPTION OF THE INVENTION

A glyoxal modified aqueous starch dispersion is prepared which is readily flowable and wherein gelation and viscosity increases over time are inhibited. The starch dispersion is prepared by gelatinizing an aqueous suspension or slurry of starch granules and reacting the starch with a glyoxal compound at temperatures of at least 70° C., preferably 85° to 95° C. Preferably gelatinization and the reaction with glyoxal are carried out simultaneously, although the starch can be pre-gelatinized and then reacted with the glyoxal compound with heating.

It is theorized that by reacting gelatinized starch at the higher temperatures with glyoxal the amylose is derivitized with the glyoxal so that retrogradation of the amylose and the formation of amylose fatty acid complexes upon cooling is inhibited, resulting in aqueous dispersions having a flowable viscosity and in which gelation and viscosity increases over time are inhibited. Without intending to be bound by theory it is believed that the glyoxals react with amylose to make highly labile hemi-acetals which disrupt the crystallinity of amylose, thus significantly inhibiting retrogradation. Further, it is believed that glyoxal added after gelatinization and cool-down does not form hemi-acetals with the same efficiency as those added during heating because after gelatinization and cool-down crystallization occurs which limits the sites of reaction with glyoxal.

The starch dispersion prepared according to this invention will generally have a viscosity of less than 1000 cps, preferably less than 350 cps. Except where otherwise indicated, viscosity readings set forth herein are taken in aqueous solution at 35% solids content (by weight), are Brookfield viscosities (RV, #3 spindle at 100 rpm), and viscosity readings are taken at room temperature.

As used herein, the term "glyoxal compound" includes not only glyoxal but also derivatives thereof including blocked glyoxal resins. Suitable blocked glyoxal resins which may be used in accordance with the invention are described in U.S. Pat. No. 4,695,606 and include but are not limited to cyclic urea/glyoxal/polyol condensates, polyol/glyoxal condensates, urea or cyclic urea/glyoxal condensates and glycol/glyoxal condensates. The amount of glyoxal compound may be adjusted within broad limits, but is generally from about 3% to about 30%, preferably 9 to 20%, of the total dry weight of starch (and/or derivatives thereof) present.

In accordance with the invention, an aqueous slurry of starch is prepared. Preferably the starch is an amylose containing starch. The starch may be obtained from any conventional source, including potato, corn, waxy corn, red milo, white milo, wheat and tapioca and may be a dextrin, maltodextrin, cyclodextrin, oxidized, hydroxyalkylated, acid modified, cationic, enzyme converted or various combinations thereof. Particularly suitable to this invention are thin-boiling starches that have been additionally chemically modified to reduce the setback or retrogradation tendencies of the starch. The prior art describes methods for making a wide variety of starch derivatives that display reduced setback. Because of low cost and effectiveness for reducing setback, the preferred starch is a thin-boiling starch derivative such as oxidized, hydroxyethyl starch, starch phosphate, hydroxyethyl starch phosphate, starch acetate, starch propionamide and starch maleate. These derivatives may be used alone or in combination with thin-boiling starches, maltodextrins or dextrins to provide for a lower cost or to obtain desired viscosity characteristics. Maltodextrins or dextrins may be used alone as the starch component of this invention as dextrins and maltodextrins are pregelatinized in their manufacture. In certain preferred embodiments a blend of hydroxyethylated starch and an acid- and/or enzyme-converted starch or dextrin may be utilized. For example, dextrins and/or maltodextrins may be utilized together with an acid-modified or an oxidized hydroxyethylated starch such as a hydroxyethylated potato starch. Cationic potato starch, oxidized corn starch and acid-modified corn starch and enzyme modified corn starch are also preferred starches in accordance with the invention. Waxy starches which do not contain amylose have also shown improved film strength properties by treatment in accordance with this invention.

Where a blend of starches is utilized, it is preferred that either a maltodextrin or dextrin be blended with an acid-modified hydroxyethylated starch or an oxidized hydroxyethylated starch as higher solids of up to 35% can be achieved while being liquid at room temperature for several weeks. Other starches or derivatives may be additionally included in such blends. It is preferred that the largest portion of starch or derivative be either a maltodextrin or dextrin, and that the weight percent of other starches such as a hydroxyethylated starch be between about 5% and about 40% based on combined weight of maltodextrin and dextrin. A suitable blend, for example, includes but is not limited to maltodextrin and hydroxylated potato starch, wherein the weight of hydroxyethylated potato starch is about 20% of the weight of maltodextrin. Such a blend may additionally include other starches such as a cationic starch.

Preferably, the glyoxal additive is added to the aqueous starch slurry and the slurry is heated to about 90° C. for at least about 30 minutes to gelatinize the starch. The starch slurry and glyoxal compound may be heated briefly to higher temperatures such as those obtained with a steam injection cooker. The heat beneficially drives the reaction of the glyoxal compound and starch simultaneously with starch gelatinization. The resulting gelatinized starch composition is then preferably treated with a biocide, preferably after it has been allowed to cool to about 60° C. Biocide is preferably added at a concentration by weight, of about 10 ppm to about 500 ppm. Suitable biocides include Kathon ®LX from Rohm & Haas which is a mixture of 5-chloro-2-methyl-4-isothiazolin-3-one and 2-methyl-4-isothiazolin-3-one and Proxel ®GXL from ICI which is 1,2 benzothiazolin-3-one. Gelatinization in the presence of glyoxal compounds preferably takes place in an aqueous slurry at a solids content between about 15% and about 50% by weight, preferably between about 25% and about 35%. In alternative methods, dry starch and dry glyoxal compounds may be intermixed prior to introduction into an aqueous slurry for the gelatinization and/or reaction steps.

Acrylamide and acrylamide copolymers can also be added to to improve tensile strength of the starch films drawn down from these compositions. These polymers also react with glyoxal to form a polymer-reinforced starch film upon drying. Generally the acrylamide polymer or acrylamide copolymer is added at a level of up to 50% by weight of the blocked glyoxal resin. The acrylamide is preferably a copolymer of acrylamide and methacrylic acid having a molar ratio of about 3 to 1.

The invention is further illustrated by the following examples which are set forth only as illustrations of the invention and not as limitations thereof.

EXAMPLE I

To a 2-liter resin kettle was added 560 g of water, 206.4 g of maltodextrin (Maltrin ®M040, having a dextrose equivalent of 5 and available from GPC) and 33.6 g of a hydroxyethylated acid modified potato starch (Polaris Gum ®LV, available from Penford Products), which made a slurry of 30% solids. This slurry was heated with agitation to 90° C. for 30 minutes to gelatinize the potato starch. The batch was then cooled to 60° C. and 372 g was withdrawn to comprise Sample A. Two drops of a biocide was added as a preservative. To the remaining 428 g of clear, colorless starch solution was added 27.5 g of a cyclic urea/glyoxal condensate (Sequex ®R, a 2:1 ratio of glyoxal to cyclic urea, 45% solids available from Sequa Chemicals Inc.). This caused the color of the starch solution to become a clear, light amber. The starch solution was then reheated to 90° C. for 30 minutes and allowed to cool to 60° C. The sample was bottled, preserved with 2 drops of biocide and labeled Sample B.

After standing overnight, Sample A was white and opaque in appearance with a Brookfield viscosity of 179 cps. Sample B was a clear, light amber liquid with a viscosity of 90 cps. One day later Sample A was completely gelled. Sample B was a slightly translucent amber with a viscosity of 108 cps. Five days after Sample A had gelled, Sample B was tan opaque, the viscosity was 232 cps, and no grit or sediment was present.

EXAMPLE II

To a 2-liter resin kettle was added 600 g of water, 206.4 g of maltodextrin (Maltrin ®M040) and 33.6 g of a hydroxyethylated potato starch (Polaris Gum ®LV) and 33.6 g of a cationic potato starch (Astrocote ®75, available from Penford Products). The slurry was heated to 90° C. for 30 minutes to gelatinize the starch, then cooled to 60° C. At this temperature, 401.5 g of the clear, colorless starch dispersion was removed to form Sample A. To the remaining material was added 20 g of a cyclic urea-glyoxal condensate (Sequex ®R, 45% solids) which caused the solution to become a clear amber. The reaction mixture was heated to 90° C. for 30 minutes and then cooled to 60° C. This material was poured into a jar and labeled Sample B. Both samples were dosed with 2 drops of a biocide as a preservative.

Upon standing for 4 hours and attaining room temperature, both samples had a viscosity of 108 cps (#2 spindle at 100rpm). After standing overnight, Sample A was a soft, white gel which would not flow. Sample B was an opaque tan liquid with a viscosity of 126 cps. After 3 days, Sample B had thickened substantially with a viscosity of over 1000 cps, but would still pour. Under these exaggerated conditions, the starch modification of this invention more than tripled the pot life of this mixture as compared to gelatinization without the glyoxal compound.

EXAMPLE III

A glyoxal modified aqueous starch dispersion was prepared from 663 g of water, 58 g of a blocked glyoxal resin (Sequex ®R, 45% solids), 227.9 g of a maltodextrin (Maltrin ®M040) and 42 g of a hydroxyethylated potato starch (Polaris Gum ®LV). This mixture was heated to 90° C. for 30 minutes in a 2-liter resin kettle which allowed the resin to react with the starch as gelatinization proceeded. After cooling to 40° C., a biocide was added as a preservative. This modified starch dispersion served as the basis for a co-binder in fiberglass roofing mat replacing an acrylic latex with equal or better performance on a dry pound basis. The binder product had a shelf life in excess of 4 months.

EXAMPLE IV

As a comparative example, the procedure of Example III was repeated except that in a Comparative Sample the blocked glyoxal resin was added after cooling the starch solution to room temperature. Viscosities of the two starch dispersions of Example III and the Comparative Sample were compared over time. Initially, both dispersions were 70 cps. After standing for 3 days, the dispersion of Example III was still a clear amber, while the Comparative Sample showed signs of retrogradation and was an opaque tan. After one week, the dispersion of Example III had a viscosity of 80 cps while the viscosity of the Comparative Sample was 115 cps. In 2½ months, the viscosity of Example III was 285 cps. The Comparative Sample had gelled. This demonstrates the benefit of reacting the starch with the glyoxal compound at higher temperatures as opposed to simply mixing together.

EXAMPLE V

Examples I-IV pertain to improved stability of amylose-containing starches. Example V pertains to an unexpected way of getting improved performance out of a starch film which works for regular starch or waxy starches which do not contain amylose.

An acid-modified corn starch (Keofilm ®90, available from Hubinger Corporation) was selected for film studies. As a control, a 20% solution of Keofilm ®90 was prepared, heated to 90° C. for 30 minutes, then cooled. A film, Sample A, was drawn down on Mylar, then dried and cured for 2 minutes at 250° F.

A second batch of Keofilm ®90, identical to the first, was prepared. Upon cooling, 10% by dry weight of a blocked glyoxal resin (Sequex ®R) was added and thoroughly mixed. A film, Sample B was drawn down on Mylar, then dried and cured for 2 minutes at 250° F.

A third batch of Keofilm ®90 was prepared, identical to the first, except that the 10% of blocked glyoxal resin (Sequex ®R) was added before the starch was heated. After cooking at 90° C. for 30 minutes, the starch dispersion was cooled, and a film drawn down on Mylar. This film, Sample C, was then dried and cured for 2 minutes at 250° F. All 3 films were tested for tensile and elongation on an Instron Model 1110 Tensile Tester (films where 2 inches×7/16 inches and 12-13 mil. thick) with the results as shown in Table I.

TABLE I

| Sample | Dry Tensile (Kg) | Dry Elongation (%) | Wet Tensile (Kg) | Wet Elongation (%) |
|---|---|---|---|---|
| A | 7.19 | 5.6 | 0.11 | 3.72 |
| B | 8.82 | 5.6 | 1.81 | 8.26 |
| C | 9.42 | 6.1 | 1.98 | 8.94 |

Table I shows the benefits of this invention in that Sample C showed greater wet and dry tensile strength and elongation. The improved strength performance obtained by this invention for the starch films has also been observed in waxy starches which do not contain amylose.

The terms and descriptions used herein are preferred embodiments set forth by way of illustration only, and are not intended as limitations on the many variations which those of skill in the art will recognize to be possible in practicing the present invention as defined by the following claims.

We claim:

1. A method for producing a stable fluid aqueous modified starch dispersion composition comprising the steps of gelatinizing an aqueous slurry of a starch and reacting the starch with a blocked glyoxal resin compound at temperatures of at least 70° C.

2. The method of claim 1 wherein the amount of the glyoxal is within the range of 3 to 30% of the dry weight of the starch.

3. The method of claim 2 wherein the starch and glyoxal compound are reacted with a polymer or copolymer of acrylamide.

4. The method of claim 2 wherein the starch is reacted with the glyoxal compound during gelatinization of the starch.

5. The method of claim 4 wherein the amount of glyoxal compound is within the range of 9 to 20%.

6. The method of claim 1 wherein said glyoxal compound is a polyol/glyoxal condensate.

7. The method of claim 1 wherein said glyoxal compound is a cyclic urea/glyoxal condensate.

8. The method of claim 1 wherein said starch comprises a dextrin or a maltodextrin.

9. The method of claim 1 wherein said starch is an amylose containing starch.

10. The method of claim 1 wherein said starch comprises a hydroxyethylated starch and a maltodextrin or dextrin.

11. The method of claim 10 wherein said hydroxyethylated starch is acid-modified or oxidized.

12. A stable fluid aqueous modified starch dispersion composition comprising an aqueous dispersion of starch wherein the starch has been gelatinized and reacted at temperatures above 70° C. in the presence of 3 to 30% of a blocked glyoxal resin compound by dry weight of the starch.

13. The starch composition of claim 12 wherein said blocked glyoxal resin is a cyclic urea/glyoxal condensate.

14. The starch composition of claim 12 wherein said starch comprises dextrin or maltodextrin.

15. The starch composition of claim 12 wherein said starch is an amylose containing starch.

16. The starch composition of claim 12 wherein said starch-containing composition comprises a hydroxyethylated starch and a maltodextrin or dextrin.

17. The starch composition of claim 16 wherein said hydroxyethylated starch is an acid-modified or oxidized starch.

18. The starch composition of claim 12 wherein the glyoxal compound is added at a level of 9 to 20%.

19. The starch composition of claim 12 wherein said starch is selected from the group consisting of dextrin, maltodextrin, hydroxyethylated potato starch, cationic potato starch, acid modified corn starch, hydroxylated corn starch, acid modified corn starch, oxidized corn starch, waxy corn starch enzyme modified corn starch and mixtures of the foregoing.

20. The starch composition of claim 12 further comprising a polymer or copolymer of acrylamide which is reacted with the starch and glyoxal.

21. The starch composition of claim 12 wherein said starch is a waxy starch.

* * * * *